(12) United States Patent
Bush et al.

(10) Patent No.: US 7,676,674 B2
(45) Date of Patent: Mar. 9, 2010

(54) METHOD FOR AUTHENTICATING ELECTRONIC DOCUMENTS

(76) Inventors: George Bush, 460 E. 79$^{th}$ St., 21D, New York, NY (US) 10021; Estelle F. Ross, 41 Buxton St., Lido Beach, NY (US) 11561

( * ) Notice: Subject to any disclaimer, the term of this patent is extended or adjusted under 35 U.S.C. 154(b) by 1068 days.

(21) Appl. No.: 11/269,291

(22) Filed: Nov. 8, 2005

(65) Prior Publication Data

US 2006/0090065 A1    Apr. 27, 2006

Related U.S. Application Data

(63) Continuation-in-part of application No. 09/465,246, filed on Dec. 18, 1999, now Pat. No. 6,963,971.

(51) Int. Cl.
*H04L 29/06* (2006.01)
(52) U.S. Cl. ....................... 713/165; 713/150
(58) Field of Classification Search ......... 713/155–157, 713/161, 165, 169, 170, 150–154, 160, 162–164, 713/189–193; 380/28–30, 255–283
See application file for complete search history.

(56) References Cited

U.S. PATENT DOCUMENTS

| 5,751,813 A | * | 5/1998 | Dorenbos | 713/153 |
| 5,872,848 A | * | 2/1999 | Romney et al. | 713/176 |
| 7,436,966 B2 | * | 10/2008 | Prashanth | 380/285 |

* cited by examiner

*Primary Examiner*—Matthew B Smithers
*Assistant Examiner*—Jing Sims
(74) *Attorney, Agent, or Firm*—Day Pitney LLP

(57) ABSTRACT

A secure method for sending register, authenticated electronic documents is disclosed. The sender sends a first set of data, not including the plaintext message, encrypted with the public key of the recipient, and a second set of data, including the plaintext message, encrypted with a session key which was included in the encrypted first set of data. The recipient is first asked if he wants to receive the message, and then, upon seeing an abstract, asked if he wants to receive the full message. Confirmatory data regarding the decryption of the message and the presentation of the data to the recipient is recorded and sent to an authentication agent.

6 Claims, 3 Drawing Sheets

METHOD FOR AUTHENTICATING ELECTRONIC DOCUMENTS

This application is a continuation-in-part of application Ser. No. 09/465,246, filed on Dec. 18, 1999, now U.S. Pat. No. 6,963,971 the contents of which are hereby incorporated by reference.

BACKGROUND OF THE INVENTION

1. Field of the Invention

The invention relates to methods for authenticating electronic documents, and in particular to a method that registers proof of the exact content of electronic documents and provides for the establishment of an evidence trail.

2. Description of the Prior Art

Electronic documents such as E-mail have changed the face of commerce. The wide-spread use of electronic documents has increased the pace of commerce and is itself a product of the need to respond quickly to the demands of the marketplace. Electronic communication has replaced paper documents in many transactions. However, the move away from paper documentation to the fast-moving world of electronic documents has come at a price.

As presently configured, electronic documents lack the accountability provided by paper documents. For example, a paper contract bearing signatures provides a vastly greater level of accountability than an E-mail document. Signatures can be verified, providing for a level of non-repudiation which is not available with electronic documents. If one's signature is on a contract, it is difficult to say one was not involved in an agreement.

With E-mail, there are no signatures. Additionally, neither party has proof that the other individual received the E-mail in question, nor does either party have proof of the contents of the E-mail message. For these reasons, electronic documents cannot be trusted for evidentiary purposes.

There have been attempts to provide accountability for electronic documents. U.S. Pat. No. 5,608,800, Hoffmann et al., concerns a process intended to establish whether data transmitted to a recipient has been altered or illicitly introduced. This invention only provides a small part of the goal of making electronic documents as secure and accountable as paper documents. The method provides no means for providing the sender with proof that the intended recipient received the document, nor does the method provide for an evidence trail in the event of a dispute between sender and recipient over message content and timing.

U.S. Pat. No. 5,587,809, Le Corre et al., is a method that provides non-repudiation for fax senders and recipients. While this invention does provide a measure of non-repudiation, it is limited to faxes, requires special equipment, i.e., a secure fax machine, and provides proof only that a neutral third party sent a fax upon the request of the recipient. The recipient can still deny receipt of the fax or dispute the contents of the fax.

U.S. Pat. No. 5,615,268, Bisbee, goes further in the process of providing authentication and accountability for electronic documents. However, it requires users to have special equipment, PCM/CIA cards, and does little to protect the privacy of sender and recipient.

None of the above methods takes into account the interests of all parties concerned with authenticated electronic document transmission. With the present invention, there are four possible participants in an authenticated electronic document transmission, namely the sender, the recipient, a neutral third party, and the government. Each party must have its requirements taken into account for an authentication method to be accepted for wide-spread use.

OBJECTS AND SUMMARY OF THE INVENTION

An examination of each party's requirements shows that the participants have both similar and differing needs. A sender wants to know that only the intended recipient can have access to an authenticated message, and that eavesdroppers will be denied access. The sender wants proof that the recipient received and opened the message, and that the message sent was the message received. Finally, the sender wants an evidence trail and record that can be used in court if a dispute occurs regarding the contents and/or the time of delivery of the message.

The recipient wants to be certain of the validity of the sender's identity. The recipient wants to know that the authenticated document cannot be altered in transmission without detection. Like the sender, the recipient wants the message to be secure from eavesdropping and wants a record and evidence trail available in the event of a future dispute. Finally, the recipient wants the ability to refuse acceptance of an authenticated message if he so chooses.

The third party is concerned with liability, costs, and legal responsibility. The third party wants to be sure that the authenticated document was received as sent and is error free. The third party wants minimal records for each authenticated document. The third party wants to be able to provide absolute security and anonymity for clients except in those cases where court order requires that it allow government access. When government does require access, the third party wants to be able to provide real-time access as efficiently and inexpensively as possible.

The government wants real-time access to electronic documents in those cases where court-ordered access is granted. Governments want key escrow for all internationally transmitted, encrypted documents. The inventors believe that any method for authenticated electronic document transmission must take into account the needs cited above. Additionally, given that commerce is global, electronic document authentication methods must be adaptable to the access requirements of any government.

Besides the considerations cited above, an authentication method must be acceptable to the marketplace for pragmatic purposes. Users should not have to purchase special equipment. Any user with a computer and a modem should be able to use the system, no matter what the platform. As with the mail or commercial document delivery systems, users should be able to transmit authenticated electronic documents to strangers and to both willing and hostile recipients. Additionally, an authentication method should be user friendly, no more difficult to operate than an Automated Teller Machine.

Encryption is central to the invention because it ensures that only the intended recipient can receive the plaintext of an authenticated document, it validates sender identity and it provides privacy and security. As envisioned, the invention uses a neutral third party for key distribution, record keeping, and authenticated message distribution.

The Authentication Agent is a neutral witness to the transmission and receipt of authenticated electronic documents. Additionally, the Authentication Agent serves as a registry that keeps indisputable proof of document contents and a log of document transfers.

All users must be registered with the Authentication Agent, and must obtain authentication method software, along with a packet of session keys from the agent.

The sender composes the document and derives a plaintext document abstract which is entered in the document header by the sender's software program. The sender encrypts the document header in the public key of the authentication agent and sends the header to the authentication agent. This encrypted document header contains the name and address of the recipient, the name and address of the sender, the plaintext document abstract of the document (including the header), the session key and the public key of the recipient.

The authentication agent establishes a transaction file, containing the information in the document header and the time and date of the opening of the file. The authentication agent informs the sender that the document can be sent.

The sender encrypts the document (including the header) in the session key and a separate copy of the header in the public key of the recipient and transmits them to the recipient. The software encrypts only the header and document plaintext document abstracts registered in the transaction file of the authentication agent. In this way only the document identified by the sender to the authentication agent can be encrypted and sent to the recipient.

The recipient is informed that he has a message from the sender and asked if he wishes to read it. If he agrees, he is presented with the header of the document encrypted in his Public key.

The recipient decrypts the header, and is asked if he wishes to read the document. If he agrees, the software uses the session key to decrypt the document, derives a plaintext document abstract, and checks to see that this document abstract is identical with the one in the header. If the two document abstracts match, the recipient is presented with the validated plaintext version of the document and the authentication agent is informed of the time and date of the successful completion of the process. The authentication agent records the time and date of the successful completion of the process in the Document Transaction File.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
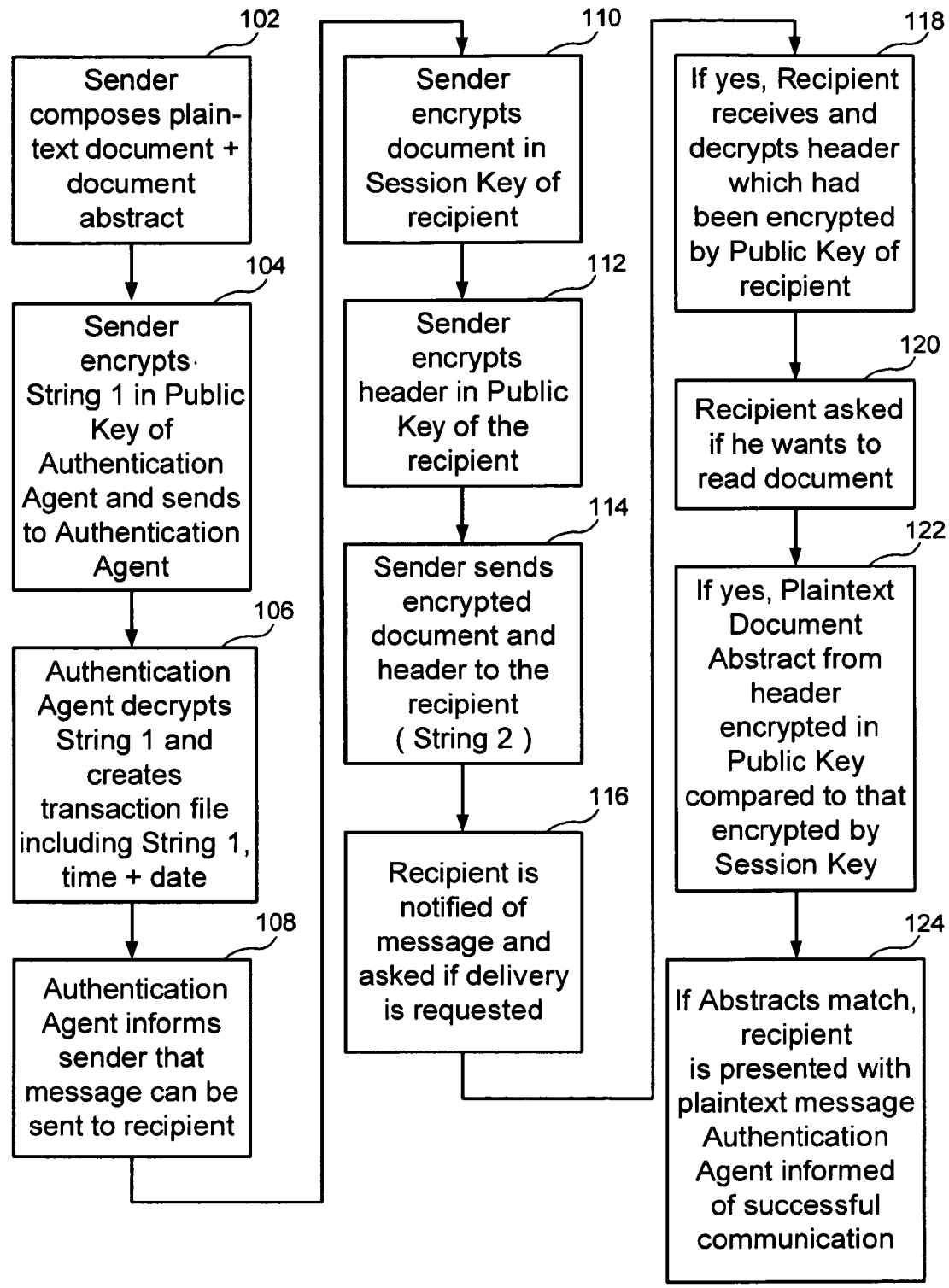
FIG. 1 is a flowchart of the process of the present invention.

Referring now to the drawings in detail wherein like numerals refer to like elements throughout the several drawings, one sees that FIG. 1 is a flowchart of the authentication process of the present invention.

At the outset, the authentication process of the present invention is highly automated. As such, the authentication agent is a computerized database. As envisioned, all interaction between the authentication agent and a sender and recipient are totally automated with no human interaction on the part of the third parties. The communication between the various parties can be any electronic communication method, such as the Internet, direct modem connections or other dedicated or non-dedicated data lines. It is further envisioned that all parties are separate entities.

It is further envisioned that the actions required of the sender and recipient in the authentication process are minimal. The sender typically defines the electronic document to be authenticated, provides the name and address of the recipient, and then indicates a commitment to send the authenticated document. All other actions taken as the sender's part of the authentication process originate from, and are governed by, the sender's authentication software.

Likewise, the recipient's actions are typically limited to indicating that he or she wishes to receive the document. All other parts of the authentication process originate from, and are governed by, the recipient's authentication software. It should be noted that sender and recipient elements are part of a single software package because all participants in the method of the invention will typically be both sender and recipient.

In FIG. 1, the sender 10 begins the authentication process by composing a plaintext document 210 and plaintext document abstract 204 as shown in block 102. The sender 10 further enters the sender's name and address 202. The sender software then creates a header (see String 1 of FIG. 3) which includes the recipient's name and electronic address 200, the sender's name and electronic address 202, the plaintext document abstract 204, the session key 206 (as previously provided in a packet from authentication agent 14), and the recipient's public key 208. This header (including data 200-208) is then encrypted in the public key of the authentication agent 14 and sent as string 1 (Step A of FIG. 2) to authentication agent 14 as shown in block 102 of FIG. 1 and as shown in FIG. 2.

As shown in block 106, authentication agent 14 decrypts string 1 and creates a transaction file, including the data from string 1 (i.e., the header data 200-208), along with the time and date. The transaction file is likewise described in the parent application Ser. No. 09/465,246, the contents of which are incorporated by reference.

Figure 2:
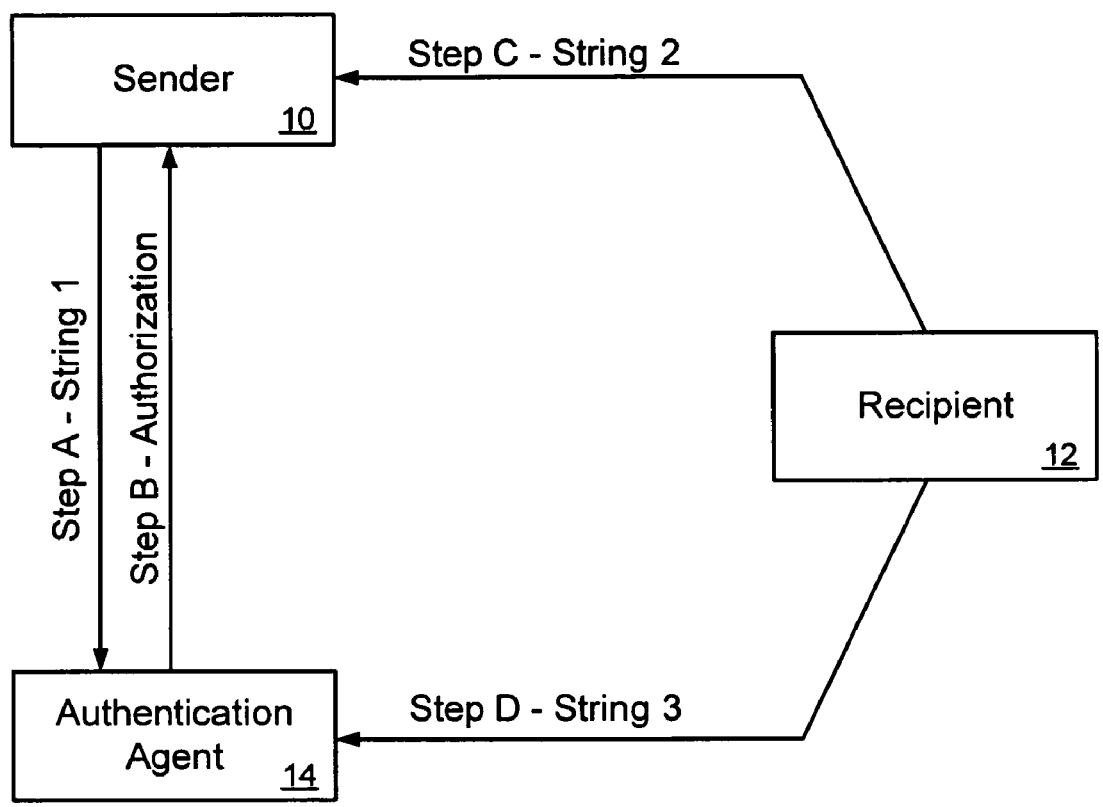
FIG. 2 is a block diagram of the interaction between the sender, the recipient and the authentication agent in the present invention.

As shown in block 108 of FIG. 1, as well as Step B of FIG. 2, authentication agent 14 informs sender 12 that a message can be sent.

As shown in block 110, the sender then encrypts the plaintext document 210 and the header (data 200-208) with the session key 206. Likewise, as shown in block 112, the sender encrypts the header (data 200-208) in the public key of the recipient. As shown in block 114 of FIG. 1 and in string 2 of FIG. 3, the results of block 110 and 112 are used to create string 2 which is sent to recipient 12, as shown in FIG. 2 as Step C. In an alternative embodiment, the plaintext document 210 (which includes the abstract) may be free of encryption in string 2, the header data does not include a session key and the data from the header is encrypted only in the public key of the recipient (that is, string 2 includes only one copy of the data from the header, and this one copy is encrypted in the public key of the recipient).

As shown in block 116, the recipient is notified that a message is available and asked to confirm if delivery is requested.

As shown in block 118, if the recipient 12 answers affirmatively to block 116, the header (data 200-208), which was encrypted with the public key of the recipient and transmitted as part of string 2, is decrypted and the plaintext document abstract 204 is presented to the recipient 12.

As shown in block 120, the recipient 12 is then asked if he wants to read the plaintext document 210.

Figure 3:
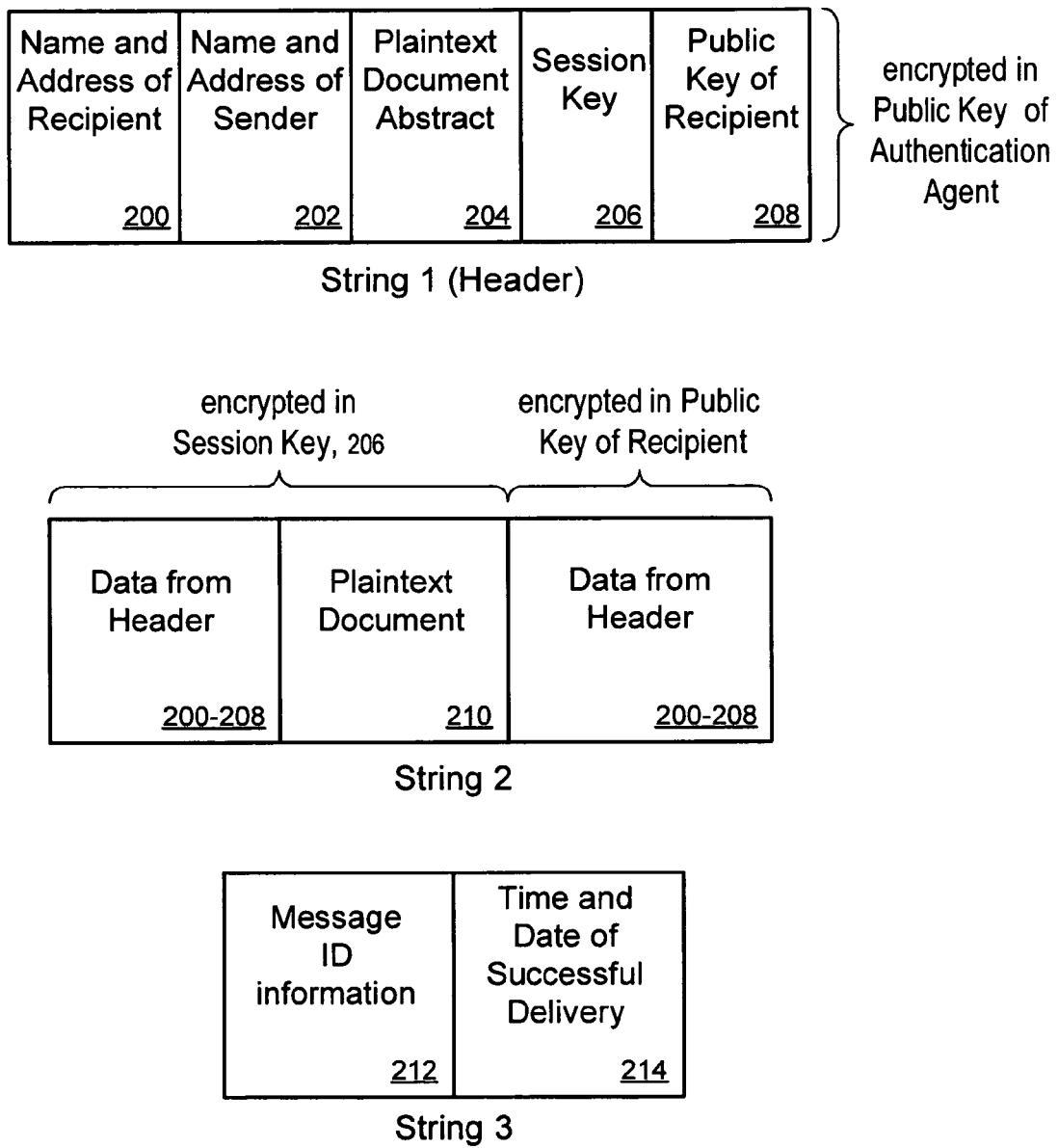
FIG. 3 is a diagram of the data strings used in the present invention.

As shown in block 122, if the recipient 12 answers affirmatively to block 118, the data in string 2 which was encrypted with the session key 206 is decrypted and the two decrypted plaintext document abstracts 204 (one from the header which was encrypted in the public key of the recipient and the other from the header which was encrypted with the session key 206, see string 2 in FIG. 3) are compared. In the alternative embodiment, plaintext document 210 is not encrypted and therefore requires no decryption at this step.

As shown in block 124, the two decrypted plaintext document abstracts 204 are compared. If the abstracts match each other, then the recipient 12 is presented with the validated plaintext document 210 (in the alternative embodiment, there is a comparison between the abstract from the unencrypted plaintext document and the abstract which is derived from the decrypted header information). Thereafter, the authentication agent is informed of the successful communication by step D of FIG. 2, string 3 of FIG. 2, including at least the message ID information 212 and the time and date of successful delivery. The authentication agent 14 can then update the transaction file appropriately to confirm receipt.

Ramifications of the Invention

The present invention provides a method by which E-mail and other modes of digital data communication can be given evidentiary qualities. No longer will companies have to depend on expensive document carriers to transport critical documents. With the present invention, a contract may be sent from New York to Tokyo via E-mail with both sender and recipient able to have complete confidence in the security and accuracy of the data transfer process. The sender will be able to prove that the recipient accessed and successfully opened the document.

Additionally, both sender and recipient can be assured that any attempt by the other party to alter the electronic document after the fact will be detected immediately. Finally, both sender and recipient will know that the Authentication Agent has a log documenting the history of the authentication process. A sender will be able to state with complete confidence that he made an electronic document available to the recipient at an exact time and date, and that the recipient accessed and successfully opened the document at an exact time and date.

Potential Enrollees to the System

Moreover, all users of internet services are identified by their Internet Service Providers and have e-mail addresses which are interoperable. This provides a database of pre-identified users which accompanying e-mail address which can easily, quickly and economically provide a vast pool of potential customers who already have the equivalent of Individual Digital Signature Certificates. Moreover, individuals identified by state license numbers (lawyers, doctors, architects, etc.) who have e-mail addresses could be enrolled in this system.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A method of secure communication of an electronic document from sender to recipient, verification of sending of the electronic document by the sender and verification of the receipt of the electronic document by the recipient, in association with at least one third party, comprising the steps of:
   the sender generating a document and an abstract of the document;
   the sender generating a first encrypted message by encrypting a first message portion with a first encryption key, said first message portion including at least said abstract and a second encryption key;
   the sender generating a second encrypted message by encrypting a second message portion with said second encryption key, said second message portion including at least said abstract and said document;
   the sender generating a third encrypted message by encrypting a third message portion with a third encryption key, said third message portion including at least said abstract and said second encryption key;
   the sender transmitting said first encrypted message to the third party;
   the sender transmitting said second and third encrypted messages to the recipient;
   the recipient decrypting said third encrypted message to obtain said abstract and said second encryption key;
   the recipient using said second encryption key, derived from decrypting said third encrypted message, to decrypt said second encrypted message to obtain said abstract and said document; and
   if said abstract from said step of decrypting said third encrypted message is identical to said abstract from said step of decrypting said second encrypted message, then giving the recipient access to said document and reporting the access to said third party.

2. The method of claim 1 wherein said first encryption key is a public key of the third party.

3. The method of claim 2 wherein said second encryption key used in said third message portion is obtained from the third party by the sender.

4. The method of claim 3 wherein said third encryption key is a public key of the recipient.

5. The method of claim 4 wherein the recipient is notified of a message and asked if the recipient wants to receive the abstract prior to said step of decrypting said third encrypted message.

6. The method of claim 5 wherein the recipient is given access to the abstract from said step of decrypting said third encrypted message and asked if the recipient wants to receive the document prior to said step of decrypting said second encrypted message.

* * * * *